(12) United States Patent
Lindemann et al.

(10) Patent No.: US 11,371,595 B2
(45) Date of Patent: Jun. 28, 2022

(54) THREE-PASS TORQUE CONVERTER WITH CLUTCH INTEGRATED WITH TURBINE

(71) Applicant: Schaeffler Technologies AG & Co. KG, Herzogenaurach (DE)

(72) Inventors: Patrick Lindemann, Wooster, OH (US); Kelly Gabor, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/159,780

(22) Filed: Jan. 27, 2021

(65) Prior Publication Data
US 2021/0231203 A1 Jul. 29, 2021

Related U.S. Application Data

(60) Provisional application No. 62/966,893, filed on Jan. 28, 2020.

(51) Int. Cl.
*F16H 45/02* (2006.01)
(52) U.S. Cl.
CPC ....... *F16H 45/02* (2013.01); *F16H 2045/021* (2013.01); *F16H 2045/0231* (2013.01); *F16H 2045/0278* (2013.01)
(58) Field of Classification Search
CPC ............. F16H 45/02; F16H 2045/0231; F16H 2045/021; F16H 2045/0278; F16H 2045/0294; F16H 2045/0215; F16H 2045/0273
See application file for complete search history.

(56) References Cited

U.S. PATENT DOCUMENTS

| | | | |
|---|---|---|---|
| 9,297,448 B1* | 3/2016 | Depraete | F16H 45/02 |
| 9,995,381 B2 | 6/2018 | Adari | |
| 10,465,782 B2 | 11/2019 | Vanni et al. | |
| 2019/0063599 A1* | 2/2019 | Matsuoka | F16H 45/02 |

FOREIGN PATENT DOCUMENTS

DE 19804635 * 8/1999

OTHER PUBLICATIONS

Machine language translation of DE19804635.*

* cited by examiner

*Primary Examiner* — Mark A Manley

(57) ABSTRACT

A torque converter comprising a front cover, an impeller having an impeller shell connected to the front cover, a turbine having a turbine shell, and a lock-up clutch configured to selectively couple the turbine shell to the impeller shell for torque transmission therebetween is disclosed. In embodiments, the lock-up clutch comprises a flange connected to the turbine shell that extends radially outward therefrom, a piston disposed axially between the front cover and the turbine, and a piston actuation plate connected to the piston. The piston may be connected to the front cover and configured to actuate the piston actuation plate to press the flange against the impeller shell to connect the turbine shell to the impeller shell for torque transmission therebetween.

17 Claims, 2 Drawing Sheets

THREE-PASS TORQUE CONVERTER WITH CLUTCH INTEGRATED WITH TURBINE

CROSS-REFERENCE TO RELATED APPLICATIONS

This application claims the benefit of U.S. Provisional Patent Application No. 62/966,893, filed Jan. 28, 2020, the disclosure of which is incorporated in its entirety by reference herein.

TECHNICAL FIELD

The present disclosure relates generally to torque converters and more specifically to three-pass torque converters having a clutch integrated with the turbine.

BACKGROUND

Many vehicles include a launch device between the engine and the transmission. A torque converter is a type of launch device commonly used in vehicles having an automatic transmission. A typical torque converter includes an impeller fixed to the crankshaft of the engine and a turbine fixed to a turbine shaft, which is the input to the transmission. To improve fuel economy, most torque converters include a bypass or lock-up clutch that mechanically couples the turbine shaft to a case of the torque converter to bypass the fluid coupling. In some torque converters, the lock-up clutch may be integrated with the turbine.

SUMMARY

In general, embodiments of the present disclosure provide a torque converter comprising a front cover, an impeller having an impeller shell connected to the front cover, a turbine having a turbine shell, and a lock-up clutch configured to selectively couple the turbine shell to the impeller shell for torque transmission therebetween. In embodiments, the lock-up clutch comprises a flange connected to the turbine shell that extends radially outward therefrom, a piston disposed axially between the front cover and the turbine, and a piston actuation plate connected to the piston. The piston may be connected to the front cover and configured to actuate the piston actuation plate to press the flange against the impeller shell to connect the turbine shell to the impeller shell for torque transmission therebetween.

In embodiments, a dam plate is connected to the front cover and the piston is sealed to the front cover at an outer diameter and is sealed to the dam plate at an inner diameter. A clutch apply chamber may be formed, at least in part, by the front cover, the piston, and the dam plate. In response to pressurized fluid being supplied to the clutch apply chamber, the piston may be configured to displace in an axial direction toward the turbine such that the piston actuation plate actuates to press the flange against the impeller shell for clutch engagement. In embodiments, the piston actuation plate includes an axially extending portion connected to the piston and a radially extending portion configured to contact the flange when the lock-up clutch is closed. The piston actuation plate may be connected to the piston via a tabbed connection. In embodiments, a first friction material may be disposed between, and affixed to one of, the radially extending portion of the piston actuation plate and the flange. Likewise, a second friction material may be disposed between, and affixed to one of, the flange and the impeller shell.

In embodiments, a first fluid chamber is formed, at least in part, by the front cover, the piston, and the dam plate; a second fluid chamber is formed, at least in part, by the dam plate, the piston, the piston actuation plate, and the turbine; and a third fluid chamber is formed, at least in part, by the turbine and the impeller. A damper may be disposed axially between the piston and the turbine, wherein the piston actuation plate may be connected to the piston radially outside of the damper. The damper may further include an input ring connected to the turbine shell. In embodiments, the piston actuation plate may include an axially extending portion connected to the piston and a radially extending portion. The flange may be configured to contact the radially extending portion on a first side and to contact the impeller shell on a second side when the lock-up clutch is closed. In embodiments, the front cover includes a radially extending portion and an axially extending portion, the piston is sealed to the axially extending portion of the front cover at an outer diameter, and the piston is connected to the radially extending portion of the front cover. The piston may be connected to the radially extending portion of the front cover via a leaf-spring connection such that the piston is displaceable in an axial direction. Moreover, the flange and the turbine shell may be formed integrally, as a single-piece, wherein the flange may be disposed radially outward of the at least one blade of the turbine.

Embodiments disclosed herein provide the advantageous benefit of reduced costs and complexity of three-pass torque converters, for example, by removing a hub that is typically used to direct flow to appropriate apply and cooling circuits.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
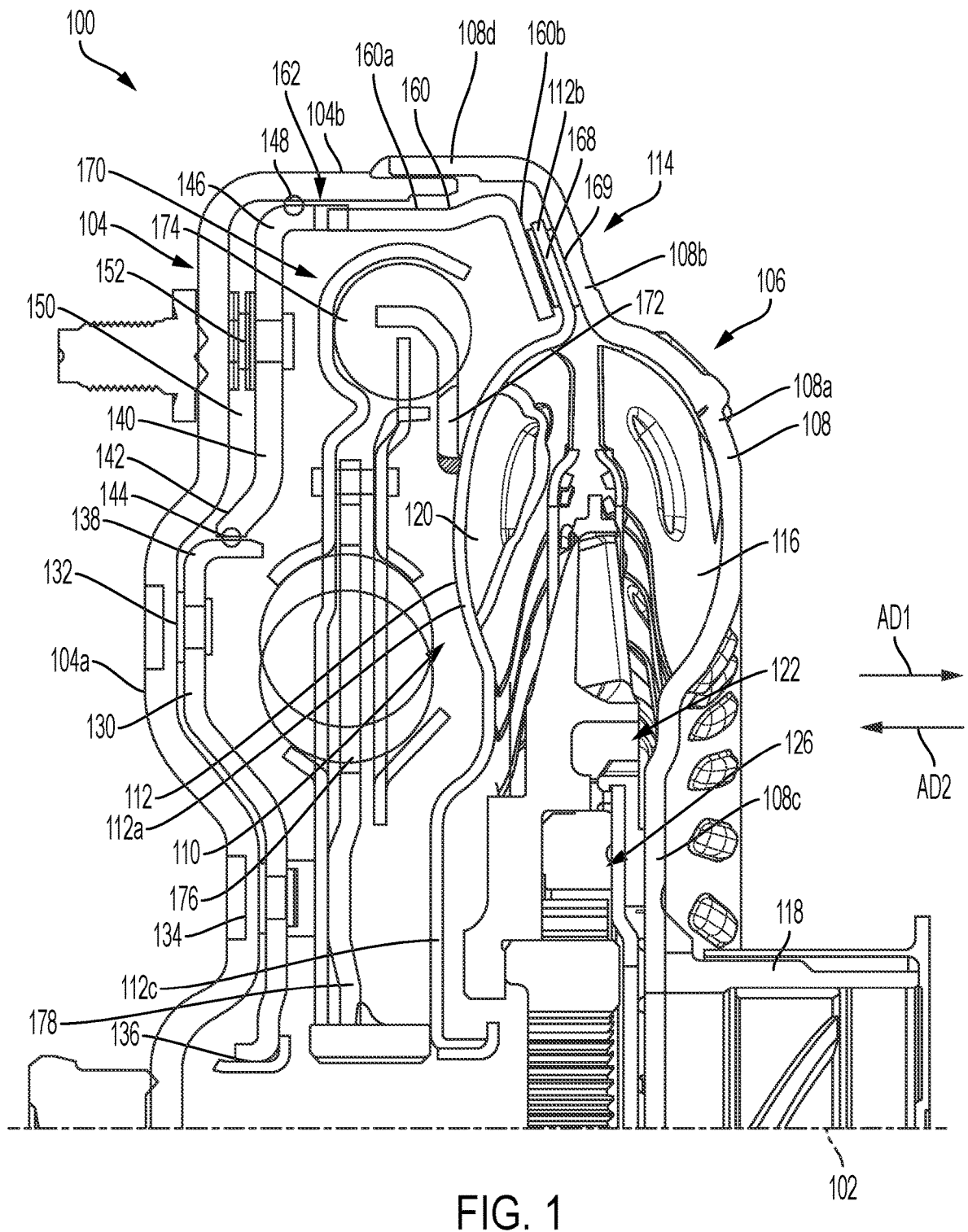
FIG. 1 is a cross-sectional view of a torque converter according to an embodiment of the present disclosure.
Figure 2:
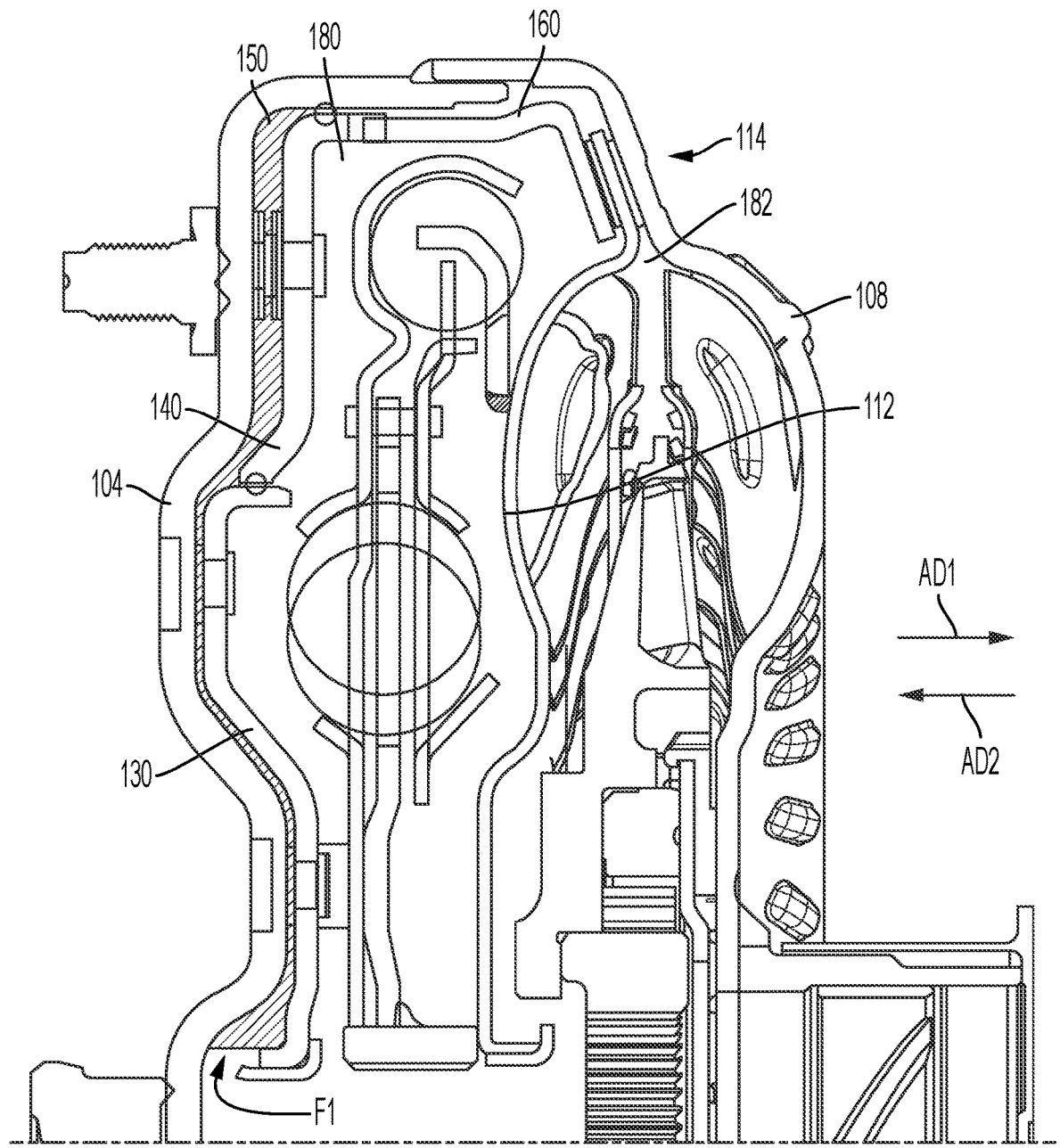
FIG. 2 shows the apply pressure flow area of the torque converter of FIG. 1.

FIG. 1 is a cross-sectional view of torque converter 100 in accordance with an embodiment of the present disclosure. FIG. 2 shows the apply pressure flow area of torque converter 100. The following description is made with reference to FIGS. 1-2. Torque converter 100 is rotatable about a center axis 102 that includes: front cover 104 for connecting to a crankshaft of an internal combustion engine; impeller 106 including impeller shell 108 non-rotatably fixed to front cover 104; turbine 110 fluidly coupled to impeller 106 and including turbine shell 112; and lock-up clutch 114 formed in part by impeller shell 108 and turbine shell 112. Components that are non-rotatably fixed rotate in unison. The terms axially, radially and circumferentially as used herein are used with respect to center axis 102.

Front cover 104 includes radially extending section 104a that extends substantially perpendicular to center axis 102 and axially extending section 104b that extends substantially parallel to center axis 102. Impeller shell 108 includes: rounded blade support portion 108a for supporting blades 116 attached thereto; outer radial extension 108b extending radially outward of rounded blade portion 108a and forming part of lock-up clutch 114; inner radial extension 108c extending radially inward from rounded blade support portion 108a that, at an inner end thereof, is fixed to impeller hub 118 (e.g., by welding); and axially extending section 108d extending from a radially outermost end of radial extension 108b and fixed to axially extending section 104b of front cover 104 (e.g., by welding). Outer radial extension 108b, rounded blade portion 108a, inner radial extension 108c, and axially extending section 108d of impeller shell 108 may be formed integrally as a single piece. Likewise, turbine shell 112 includes: rounded blade support portion 112a for supporting blades 120 attached thereto; outer radial extension or flange 112b extending radially outward of rounded blade portion 112a and forming part of lock-up clutch 114; and inner radial extension 112c extending radially inward from rounded blade support portion 108a that, at an inner end thereof, is connected to a transmission input shaft that supplies power to the transmission. Outer radial extension or flange 112b, rounded blade portion 112a, and inner radial extension 112c of turbine shell 112 may be formed integrally as a single piece.

Torque converter 100 further includes stator 122 coupled to a stator shaft (not shown) by one-way clutch 126, for example. Rotation of impeller 106 forces fluid to move between impeller 106, turbine 110, and stator 122. The fluid exerts a hydrodynamic torque on turbine 110. Stator 122 provides a reaction force causing the torque on turbine 110 to be greater than the torque on impeller 106. When the speed of turbine 110 approaches that of impeller 106, fluid tends to flow around the centerline of the torque converter, causing one-way clutch 126 to overrun.

Torque converter 100 further includes seal dam plate 130 adjacent, and fixed, to radially extending section 104a of front cover 104. Seal dam plate 130 may be rigidly fixed to front cover 104 via extruded rivets 132, 134, for example. It is to be understood that seal dam plate 130 may be fixed to front cover 104 via alternative arrangements, for example, welding. This connection allows for stiffness in seal dam plate 130, as high or significant deflection may occur at high speeds and pressures. Seal dam plate 130 may be centered on and connected to the transmission input shaft at inner diameter 136. Piston 140 may be connected to seal dam plate 130. That is, inner diameter 142 of piston 140 may be connected to outer diameter 138 of seal dam plate 130 via seal 144. Outer diameter 146 of piston 140 is sealed to axially extending section 104b of front cover 104 via seal 148 to form an apply chamber 150 for engagement of clutch 114. Pressurized fluid F1 shown in FIG. 2 may be supplied from a transmission input shaft to apply chamber 150 to displace piston 140 in axial direction AD1 toward impeller shell 108 to engage or close clutch 114 for transmission of torque therebetween.

Piston 140 may further be connected to radially extending section 104a of front cover 104, for example, by leaf-spring connection 152 that allows axial movement of piston 140 in axial direction AD1 and axial direction AD2, opposite axial direction AD1, to engage and disengage clutch 114 to selectively transmit torque between turbine shell 112 and impeller shell 108 (i.e., mechanically couple turbine 110 to cover 104). Piston 140 is further connected to piston actuation plate 160 via connection 162. Connection 162 may be a tabbed connection that allows for thrust to be transferred therethrough. That is, during apply conditions, piston 140 is configured to move in axial direction AD1 toward turbine 110, thrusting through connection 162 allowing piston actuation plate 160 to close or engage clutch 114. Piston actuation plate 160 may include an axially extending section 160a substantially parallel to center axis 102 connected to piston 140 at one end and radially extending section 160b extending radially inward toward center axis 102 from another, opposite end of axially extending section 160a to form part of lock-up clutch 114.

In this way, lock-up clutch 114 is formed in part by: piston actuation plate 160, piston 140, outer radial extension 112b of turbine shell 112, and outer radial extension 108b of impeller shell 108. Outer radial extension 112b is disposed between radially extending section 160b of piston actuation plate 160 and outer radial extension 108b of impeller shell 108. Friction material or facing 168 may be disposed between, and affixed to one of, radially extending section 160b and outer radial extension 112b. Friction material or facing 169 may be disposed between, and affixed to one of, outer radial extension 112b of turbine shell 112 and outer radial extension 108b of impeller shell 108.

Damper assembly 170 may be disposed axially between piston 140 and turbine 110 and is configured for transferring torque from turbine 110 to the transmission input shaft. In this embodiment, damper assembly 170 is connected to turbine shell 112 via input ring 172, circumferentially engaging a radially outer set of springs 174 and radially inner set of springs 176 and including output flange 178 couple to the transmission input shaft. Connection 162 of piston 140 and piston actuation plate 160 are disposed radially outside damper assembly 170.

Torque converter 100 includes three fluid chambers: apply chamber 150, fluid chamber 180 and fluid chamber 182. Torque converter 100 may be referred to as a three-pass torque converter with the clutch integrated with the turbine. Apply chamber 150 is bounded, at least in part, by front cover 104, seal 148, piston 140, seal 144, and seal dam plate 130. Fluid chamber 180 is bound, at least in part, by seal dam plate 130, piston 140, piston actuation plate 160 and turbine shell 112. Fluid chamber 182 is bound, at least in part, by turbine shell 112 and impeller shell 108.

During clutch apply mode, pressurized fluid F1 is supplied to apply chamber 150 to displace piston 140 in axial direction AD1 toward turbine 110, thrusting through connection 162 such that piston actuation plate 160 and in particular, radially extending section 160b, contacts or presses against a first side of outer radial extension 112b forcing a second side of outer radial extension 112b against outer radial extension 108b of impeller shell 108 to close or engage clutch 114. That is, turbine shell 112 is mechanically connected to impeller shell 108 to bypass the hydrodynamic power flow path of the torque converter when clutch 114 is closed. During clutch release mode, pressure in fluid chamber 180 and/or 182 exceeds that of apply chamber 150.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS

100 torque converter
102 center axis
104 front cover
104a radially extending section of front cover
104b axially extending section of front cover
106 impeller
108 impeller shell
108a rounded blade portion of impeller shell
108b outer radial extension of impeller shell
108c inner radial extension of impeller shell
108d axially extending section of impeller shell
110 turbine
112 turbine shell
112a rounded blade portion of turbine shell
112b outer radial extension of turbine shell
112c inner radial extension of turbine shell
114 lock-up clutch
116 impeller blades
118 impeller hub
120 turbine blades
122 stator
126 one-way clutch
130 seal dam plate
132 rivets
134 rivets
136 inner diameter of seal dam plate
138 outer diameter of seal dam plate
140 piston
142 inner diameter of piston
144 seal
146 outer diameter of piston
148 seal
150 apply chamber
152 leaf-spring connection
160 piston actuation plate
160a axially extending section of piston actuation plate
160b radially extending section of piston actuation plate
162 connection
168 friction material
169 friction material
170 damper assembly
172 input ring
174 outer springs
176 inner springs
178 output flange
180 fluid chamber
182 fluid chamber

What is claimed is:

1. A torque converter comprising:
a front cover;
an impeller having an impeller shell connected to the front cover and including at least one blade attached to the impeller shell;
a turbine having a turbine shell and at least one blade attached thereto; and
a lock-up clutch configured to selectively couple the turbine shell to the impeller shell for torque transmission therebetween, the lock-up clutch comprising:
a flange connected to the turbine shell and extending radially outward therefrom;
a piston disposed axially between the front cover and the turbine, wherein the piston is connected to the front cover; and
a piston actuation plate connected to the piston, the piston actuation plate comprising an axially extending portion having a first end connected to the piston and a radially extending portion extending radially inward from a second end of the axially extending portion, wherein the piston is configured to actuate the piston actuation plate such that the radially extending portion contacts the flange to press the flange against the impeller shell to connect the turbine shell to the impeller shell for torque transmission therebetween.

2. The torque converter of claim 1, further comprising a dam plate connected to the front cover.

3. The torque converter of claim 2, wherein the piston is sealed to the front cover at an outer diameter and is sealed to the dam plate at an inner diameter.

4. The torque converter of claim 3, wherein a clutch apply chamber is formed, at least in part, by the front cover, the piston, and the dam plate.

5. The torque converter of claim 4, wherein, in response to pressurized fluid being supplied to the clutch apply chamber, the piston is configured to displace in an axial direction toward the turbine such that the piston actuation plate actuates to press the flange against the impeller shell for clutch engagement.

6. The torque converter of claim 1, wherein a first friction material is disposed between, and affixed to one of, the radially extending portion of the piston actuation plate and the flange.

7. The torque converter of claim 6, wherein a second friction material is disposed between, and affixed to one of, the flange and the impeller shell.

8. A torque converter comprising:
a front cover;
an impeller having an impeller shell connected to the front cover and including at least one blade attached to the impeller shell;
a turbine having a turbine shell and at least one blade attached thereto;
a dam plate connected to the front cover; and a lock-up clutch configured to selectively connect the turbine shell to the impeller shell for torque transmission therebetween, the lock-up clutch comprising:
a flange connected to the turbine shell and extending radially outward therefrom;
a piston disposed axially between the front cover and the turbine, wherein the piston is sealed to the front cover and the dam plate; and
a piston actuation plate connected to the piston, the piston actuation plate comprising an axially extending portion having a first end connected to the piston and a radially extending portion extending radially inward from a second end of the axially extending portion, wherein the piston is configured to actuate the piston actuation plate such that the radially extending portion contacts the flange to press the flange against the impeller shell to connect the turbine shell to the impeller shell for torque transmission therebetween.

9. The torque converter of claim 8, wherein:
a first fluid chamber is formed, at least in part, by the front cover, the piston, and the dam plate;
a second fluid chamber is formed, at least in part, by the dam plate, the piston, the piston actuation plate, and the turbine; and
a third fluid chamber is formed, at least in part, by the turbine and the impeller.

10. The torque converter of claim 9, wherein pressurized fluid is supplied to the first fluid chamber to close the lock-up clutch.

11. The torque converter of claim 8, further comprising a damper disposed axially between the piston and the turbine, wherein the piston actuation plate is connected to the piston radially outside of the damper.

12. The torque converter of claim 11, wherein the damper includes an input ring connected to the turbine shell.

13. The torque converter of claim 8, wherein the flange is configured to contact the radially extending portion on a first side and to contact the impeller shell on a second side when the lock-up clutch is closed.

14. The torque converter of claim 8, wherein:
the front cover includes a radially extending portion and an axially extending portion;
the piston is sealed to the axially extending portion of the front cover at an outer diameter; and
the piston is connected to the radially extending portion of the front cover.

15. The torque converter of claim 14, wherein the piston is connected to the radially extending portion of the front cover via a leaf-spring connection such that the piston is displaceable in an axial direction.

16. The torque converter of claim 8, wherein the flange and the turbine shell are formed integrally, as a single-piece.

17. The torque converter of claim 8, wherein the flange is disposed radially outward of the at least one blade of the turbine.

* * * * *